United States Patent
Liu et al.

(10) Patent No.: US 12,242,693 B2
(45) Date of Patent: Mar. 4, 2025

(54) DISPLAY DEVICE, DRIVING METHOD THEREOF, AND ACTIVE STYLUS THEREOF

(71) Applicant: Wuhan China Star Optoelectronics Semiconductor Display Technology Co., Ltd., Hubei (CN)

(72) Inventors: Yitong Liu, Hubei (CN); Houfu Gong, Hubei (CN); Zengjian Jin, Hubei (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 17/796,286

(22) PCT Filed: Jun. 7, 2022

(86) PCT No.: PCT/CN2022/097466
§ 371 (c)(1),
(2) Date: Jul. 29, 2022

(87) PCT Pub. No.: WO2023/231057
PCT Pub. Date: Dec. 7, 2023

(65) Prior Publication Data
US 2024/0184400 A1    Jun. 6, 2024

(30) Foreign Application Priority Data
May 30, 2022  (CN) .......................... 202210596436.6

(51) Int. Cl.
*G06F 3/041*    (2006.01)
(52) U.S. Cl.
CPC .......... *G06F 3/0418* (2013.01); *G06F 3/0414* (2013.01); *G06F 3/04162* (2019.05)

(58) Field of Classification Search
CPC ... G06F 3/0418; G06F 3/0414; G06F 3/04162
See application file for complete search history.

(56) References Cited

U.S. PATENT DOCUMENTS

| | | | |
|---|---|---|---|
| 8,638,320 B2 * | 1/2014 | Harley | G06F 3/0442 345/173 |
| 2013/0106797 A1 | 5/2013 | Pant | |

(Continued)

FOREIGN PATENT DOCUMENTS

| | | |
|---|---|---|
| CN | 107977112 | 5/2018 |
| CN | 110737370 | 1/2020 |

(Continued)

OTHER PUBLICATIONS

International Search Report and the Written Opinion Dated Jan. 18, 2023 From the International Searching Authority Re. Application No. PCT/CN2022/097466 and its Translation into English. (20 Pages).

*Primary Examiner* — Patrick N Edouard
*Assistant Examiner* — Joseph P Fox

(57) ABSTRACT

The present application provides a display device, a driving method thereof, and an active stylus thereof. The display device uses a second time section to transmit display data, uses a first time section and a third time section to transmit uplink signals with a lower anti-interference ability, and simultaneously adjusts a data transmission sequence of the active stylus and uses the third time section to transmit first touch data with a lower anti-interference ability to prevent interference of the display noise with the data of the active stylus and improve a recognition rate of touch data of the active stylus.

20 Claims, 6 Drawing Sheets

(56) References Cited

U.S. PATENT DOCUMENTS

| | | | | |
|---|---|---|---|---|
| 2016/0366661 | A1* | 12/2016 | Yoshizawa | H04W 56/0065 |
| 2018/0024654 | A1* | 1/2018 | Koike | G06F 3/0441 |
| | | | | 345/174 |
| 2021/0200404 | A1* | 7/2021 | Kim | G06F 3/0412 |
| 2021/0349575 | A1* | 11/2021 | Zhang | G06F 3/041 |

FOREIGN PATENT DOCUMENTS

| | | |
|---|---|---|
| CN | 110794982 | 2/2020 |
| CN | 111352520 | 6/2020 |
| CN | 113238668 | 8/2021 |
| CN | 114265513 | 4/2022 |
| CN | 114546150 | 5/2022 |

\* cited by examiner

DISPLAY DEVICE, DRIVING METHOD THEREOF, AND ACTIVE STYLUS THEREOF

RELATED APPLICATIONS

This application is a National Phase of PCT Patent Application No. PCT/CN2022/097466 having International filing date of Jun. 7, 2022, which claims the benefit of priority of Chinese Patent Application No. 202210596436.6 filed on May 30, 2022. The contents of the above applications are all incorporated by reference as if fully set forth herein in their entirety.

FIELD AND BACKGROUND OF THE INVENTION

The present application relates to a field of display technologies, especially to a display device, a driving method thereof, and an active stylus thereof.

A conventional touch display device is equipped with an active stylus for convenience of operation of the touch display device. During operation of the active stylus, mutual signal transmission between a touch chip and the active stylus drives the display panel to display corresponding images or converted images according to the operation of the active stylus. In particular, a touch display device with a protocol of an universal serial interface is used as an example. During communication of the touch chip with the active stylus, shake-hand signals of the active stylus are received to implement connection between the active stylus and the display panel. Also, touch signals of the active stylus are received to determine operation of the active stylus to display corresponding images or conversion images on the display panel. Because a communication protocol between the active stylus and the touch chip employs a waveform with a certain frequency, noise exists during display of the display panel. When a frequency of the noise approximates to a frequency of signals of the active stylus, interference with signals of the active stylus occurs to result in errors in messages such that correct images cannot be shown according to touch signals of the active stylus.

Therefore, the conventional touch display device has a technical issue that has display noise interfering with signals of the active stylus to cause failure of displaying correct images.

SUMMARY OF THE INVENTION

Technical Issue

An embodiment of the present application provides a display device, a driving method thereof, and an active stylus thereof to ease a technical issue that a conventional touch display device has display noise interfering with signals of the active stylus to cause failure of displaying correct images.

Technical Solution

To solve the above issue, technical solutions provided by the present application are as follows:

The embodiment of the present application provides a display device, the display device includes:

a display panel including a first frequency and a second frequency, wherein the first frequency is greater than the second frequency, and a display time of a frame corresponding to the second frequency includes a first time section, a second time section, and a third time section in a sequence; and a touch chip connected to the display panel, wherein the touch chip is configured to transmit an uplink signal to an active stylus in the first time section and in the third time section in a previous frame when the display panel is at the second frequency, and receive a downlink signal returned by the active stylus according to the uplink signal, and the downlink signal includes first touch data and second touch data, and an anti-interference ability of the first touch data is lower than an anti-interference ability of the second touch data;

wherein the touch chip is configured to transmit display data in the second time section, receive the first touch data in the third time section, and drive the display panel according to the downlink signal.

In some embodiments, the touch chip is configured to in real time detect the active stylus, the touch chip is configured to detect the active stylus in real time, and control the display panel to switch from the first frequency to the second frequency when the active stylus existing is detected.

In some embodiments, the touch chip is configured to divide a display time of a frame corresponding to the second frequency by a display time of a frame corresponding to the first frequency, and divide the display time of the frame corresponding to the second frequency into the first time section, the second time section, and the third time section; a sum of a time length of the first time section and a time length of the second time section is less than a time length of the display time of the frame corresponding to the first frequency.

In some embodiments, the display time of the frame corresponding to the first frequency includes a display time section and an initialization time section, the time length of the first time section is equal to a time length of the initialization time section, and the time length of the second time section is equal to the time length of the display time section.

In some embodiments, the first touch data includes pressure data and angular data, the touch chip is configured to sequentially receive the pressure data and the angular data in the third time section, or sequentially receive the angular data and the pressure data in the third time section.

In some embodiments, a time length of the third time section is greater than a sum of a time length of transmission of the pressure data and a time length of the angular data.

In some embodiments, the downlink signal further includes a responsive signal, the touch chip is configured to establish a link between the display panel and the active stylus after receiving the responsive signal transmitted by the active stylus.

In some embodiments, the touch chip is configured to receive the second touch data between a time section corresponding to the responsive signal and the time section of the first touch data after receiving the responsive signal in the second time section.

Also, the embodiment of the present application provides an active stylus, the active stylus interacts with any one of the display devices in the above embodiments, and the active stylus includes:

a pen tip configured to receive an uplink signal transmitted by the touch chip, and, according to the uplink signal, transmit a responsive signal and the second touch data in the second time section and transmit pressure data in the third time section; and a pen collar configured to return angular data in the third time section, wherein the pressure data and the angular data are first touch data, and the first touch data, the second touch data, and the responsive signal is a downlink signal.

Also, the embodiment of the present application provides a display device driving method, the display device driving method drives any one of the display devices in the above embodiments, and the display device driving method includes:

detecting an active stylus in real time, and controlling the display panel to switch from the first frequency to the second frequency when the active stylus existing is detected, wherein the first frequency is greater than the second frequency, and a display time of a frame corresponding to the second frequency includes a first time section, a second time section, and a third time section in a sequence;

transmitting an uplink signal to the active stylus in the first time section and the third time section of a previous frame, and receiving a downlink signal returned by the active stylus according to the uplink signal, wherein the downlink signal includes first touch data and second touch data, anti-interference ability of the first touch data is lower than anti-interference ability of the second touch data; wherein the step further includes transmitting display data in the second time section and receiving the first touch data in the third time section; and driving the display panel according to the downlink signal.

In some embodiments, before the step of detecting the active stylus in real time, controlling the display panel to switch from the first frequency to the second frequency when the active stylus existing is detected, the method further includes: when the display panel is at the second frequency, determining a display time of one frame of the display panel, and dividing a frame into the first time section, the second time section, and the third time section according to the display time of one frame.

In some embodiments, before the step of when the display panel is at the second frequency, determining the display time of one frame of the display panel, and dividing the frame into the first time section, the second time section, and the third time section according to the display time of one frame, the method further includes:

parsing driving frequency data and determining a frequency switch mode of the display panel; and determining signal transmission modes of the display panel in different frequencies according to the frequency switch mode of the display panel.

In some embodiments, the step of when the display panel is at the second frequency, determining the display time of one frame of the display panel, and dividing the frame into the first time section, the second time section, and the third time section according to the display time of one frame, includes:

determining the display time of one frame of the display panel when the display panel is at the first frequency;

determining the display time of one frame of the display panel when the display panel is at the second frequency according to the display time of one frame of the display panel and the signal transmission mode at the first frequency; and sequentially dividing the frame into the first time section, the second time section, and the third time section according to a total time of one frame of the display panel and the display time of one frame of the display panel at the second frequency.

In some embodiments, the step of sequentially dividing the frame into the first time section, the second time section, and the third time section according to the total time of one frame of the display panel and the display time of one frame of the display panel at the second frequency, includes:

obtaining an initialization message of the display panel when the display panel is at the second frequency;

parsing the initialization message of the display panel and determining initialization time of one frame of the display panel;

determining the first time section of the display panel according to the initialization time of one frame of the display panel;

determining the second time section of the display panel according to display time of one frame of the display panel; and determining the third time section according to the total time of one frame of the display panel, the first time section, and the second time section.

In some embodiments, the step of sequentially dividing the frame into the first time section, the second time section, and the third time section according to the total time of one frame of the display panel and the display time of one frame of the display panel at the second frequency, includes:

determining the third time section of the display panel according to the signal transmission mode, the display time of one frame of the display panel at the first frequency, and at the second frequency total time of one frame of the display panel;

determining the second time section of the display panel according to display time of one frame of the display panel; and determining the first time section according to the total time of one frame of the display panel, the second time section, and the third time section.

In some embodiments, the step of receiving the first touch data in the third time section, includes:

parsing the first touch data to obtain pressure data and angular data when the display panel is at the second frequency; and in the third time section of the frame, sequentially receiving the pressure data and the angular data or sequentially receiving the angular data and the pressure data.

In some embodiments, the step of transmitting an uplink signal to the active stylus in the first time section and the third time section of the previous frame, and receiving the downlink signal returned by the active stylus according to the uplink signal, includes: receiving the second touch data in the frame.

In some embodiments, the step of receiving the second touch data in the frame, includes:

when the display panel is at the second frequency, transmitting the first touch data by the third time section of the frame, determining a first transmission time of the uplink signal, a second transmission time of the responsive signal, and a third transmission time of the first touch data;

determining a remaining time of the third time section according to the first transmission time, the second transmission time, the third transmission time, and the first time section and the third time section; and receiving the second touch data in the frame according to the second time section and the remaining time of the frame.

In some embodiments, before the step of receiving the second touch data in the frame according to the second time section and the remaining time of the frame, the method further includes:

obtaining a fourth transmission time of the second touch data; and comparing the fourth transmission time to the remaining time, and transmitting the second touch data in the remaining time when the fourth transmission time is less than the remaining time.

In some embodiments, the step of receiving the second touch data in the frame according to the second time section and the remaining time of the frame, includes:

determining data transmission time according to the second time section and the remaining time of the frame;

obtaining a fourth transmission time of the second touch data; and receiving the second touch data by the remaining time and a portion of the second time section when a sum of the fourth transmission time and a time interval of an adjacent data transmission is less than the data transmission time.

Advantages

The present application provides a display device, a driving method thereof, and an active stylus thereof. The display device includes a display panel and a touch chip. The display panel includes a first frequency and a second frequency. The first frequency is greater than the second frequency, a display time of one frame corresponding to the second frequency includes a first time section, a second time section, and a third time section in a sequence. The touch chip is connected to the display panel, and the touch chip is configured to, when the display panel is at the second frequency, transmit an uplink signal to the active stylus in the first time section and the third time section of a previous frame, and receive a downlink signal returned by the active stylus according to the uplink signal. The downlink signal includes first touch data and second touch data. An anti-interference ability of the first touch data is lower than an anti-interference ability of the second touch data. The touch chip is configured to transmit display data in the second time section, receive first touch data in the third time section, and drive the display panel according to the downlink signal. The present application divides one frame at the second frequency in the display panel into the first time section, the second time section, and the third time section, transmits the display data by the second time section, transmits the uplink signal with a lower anti-interference ability by the first time section and the third time section, adjusts data transmission sequence of the active stylus, and transmits the first touch data with the lower anti-interference ability by the third time section. When the uplink signal and the first touch data are transmitted in one frame, because the first time section and the third time section have no transmission of the display data, no display noise exists such that interference of the display noise with the data of the active stylus is prevented to improve a recognition rate of touch data of the active stylus.

DESCRIPTION OF SPECIFIC EMBODIMENTS OF THE INVENTION

The technical solution in the embodiment of the present application will be clearly and completely described below with reference to the accompanying drawings in the embodiments of the present application. Apparently, the described embodiments are merely some embodiments of the present application instead of all embodiments. According to the embodiments in the present application, all other embodiments obtained by those skilled in the art without making any creative effort shall fall within the protection scope of the present application.

The embodiment of the present application aims at technical issue of a conventional touch display device having display noise interfering with signals of an active stylus and resulting in failure of displaying correct images, and provides a display device, a driving method thereof, and an active stylus thereof to solve the above technical issue.

Figure 1:
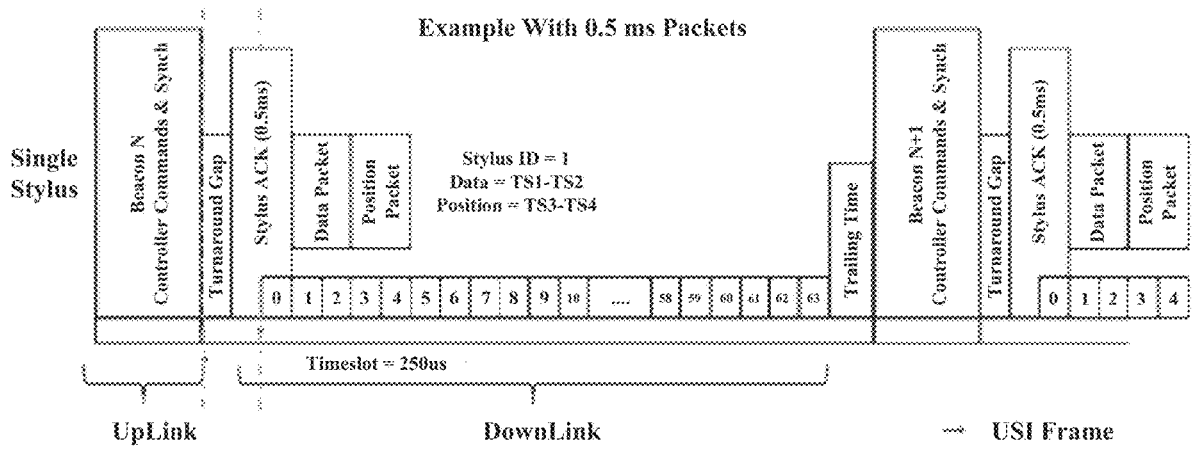
FIG. 1 is a schematic view of communication of a display device provided by the embodiment of the present application and an active stylus.

With reference to FIG. 1, an active stylus and a display device communicating with each other through a universal serial interface (USI) protocol is used as an example, an USI Frame (i.e., one frame under the universal serial interface) is as shown in FIG. 1. The active stylus, after receiving an uplink signal UpLink of the display device, would transmit Data Packet (pen pressure message) and Position Packet (position message) during returning DownLink such that the display device displays according to operation of the active stylus.

In particular, Single Stylus in FIG. 1 refers to a single active stylus, Stylus ID=1 indicates a message of the active stylus, Beacon N refers to waveforms transmitted by a driver electrode and a receiver electrode in the display device, Controller Commands & synch refers to a controller signal & synchronization, Turnaround Gap refers to a time required for an uplink signal converted to a downlink signal, Stylus ACK (0.5 ms) refers to a signal returned by the active stylus, Data=TS1-TS2 indicates a time length transmitted by the pen pressure message, Position=TS3-TS4 indicates a time length transmitted by the position message, Timeslot=250 us indicates a time length of 250 microseconds, Example With 0.5 ms Packets indicates an example of message in 0.5 ms, Trailing Time is a tail time.

Figure 2:
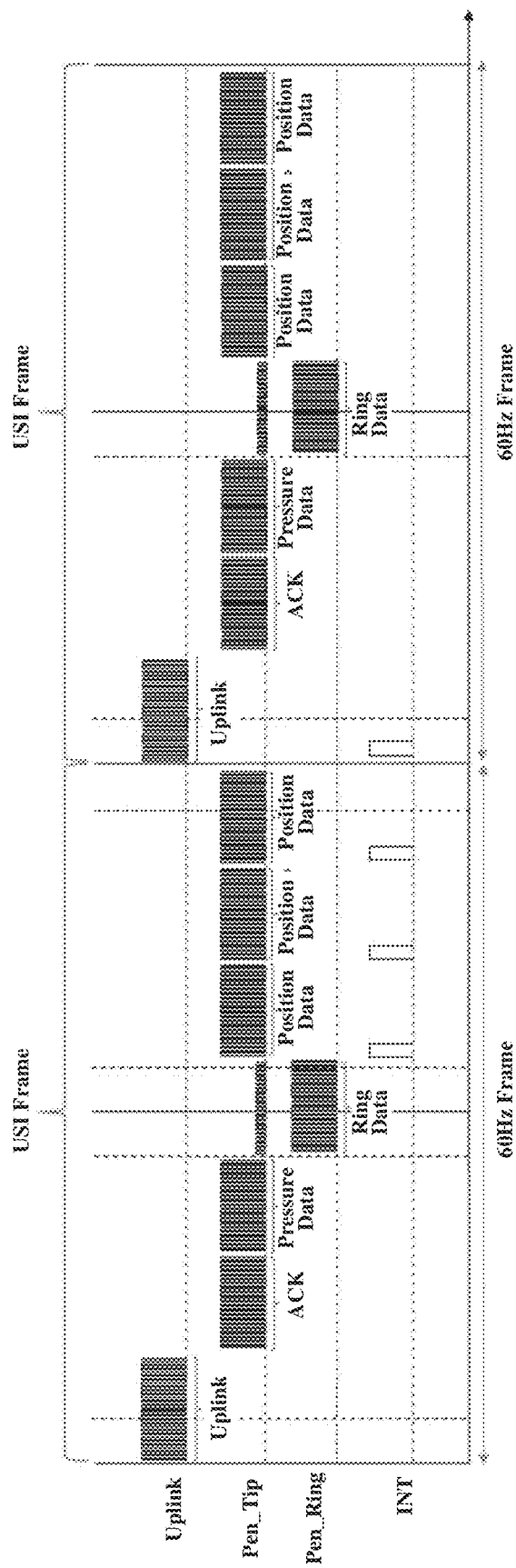
FIG. 2 is a time sequence chart of normal communication of the current display device provided by the embodiment of the present application.

With reference to FIG. 2, during current interaction of the active stylus and the display device, a frequency of the display device is 60 Hz, namely, normal transmission of signals of a 60 Hz frame (one frame at 60 Hz) in FIG. 2 is as follows. First, the display device transmits the uplink signal Uplink, and then receives the responsive signal ACK, pressure data Pressure Data, and position data Position Data returned by the pen tip Pen Tip of the active stylus, and angular data Ring Data returned by a pen collar Pen Ring of the active stylus, and simultaneously, the display signal INT is transmitted normally.

Figure 3:
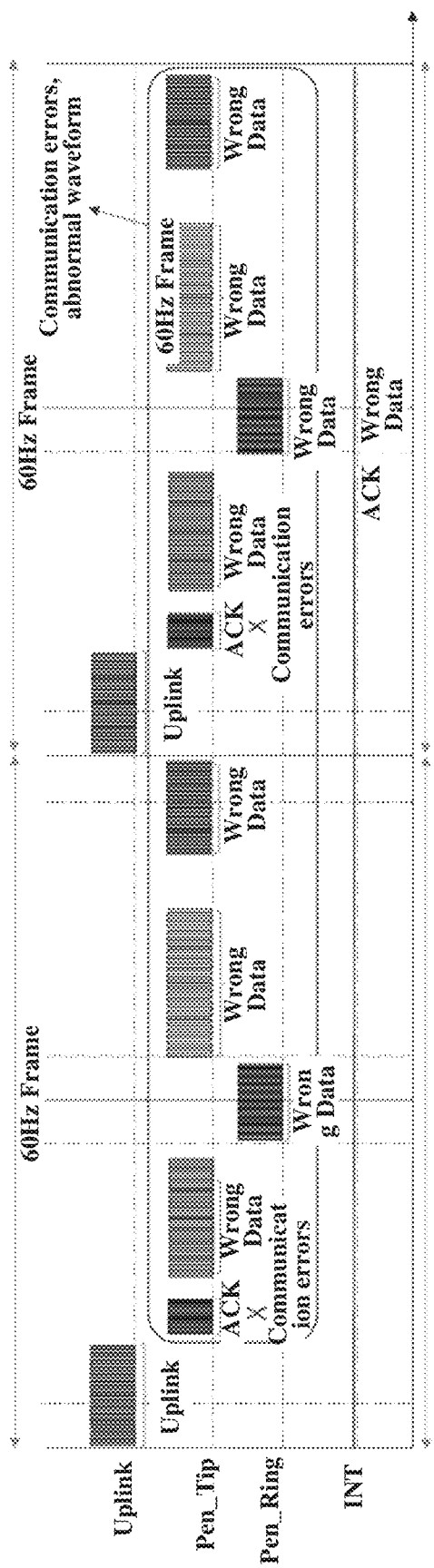
FIG. 3 is a time sequence chart of communication with errors of the current display device provided by the embodiment of the present application.

However, during signal transmission, some of the signals are easily interfered with, it results in errors of communication, as the waveform shown in FIG. 3 during signal transmission. With reference to FIG. 3, it can be seen that each signal transmitted by the active stylus is Wrong Data (wrong data), and the display device fails to display normally.

Figure 4:
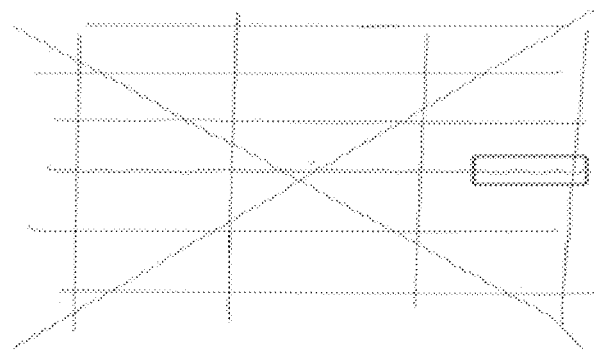
FIG. 4 is a schematic view of displayed images of communication with errors of the current display device provided by the embodiment of the present application.

With reference to FIG. 4, when signal interference occurs, during line drawing of the active stylus, the lines shown by the display device are wave-like instead of straight lines, which indicates errors on signals of the active stylus and fails normal display.

Figure 5:
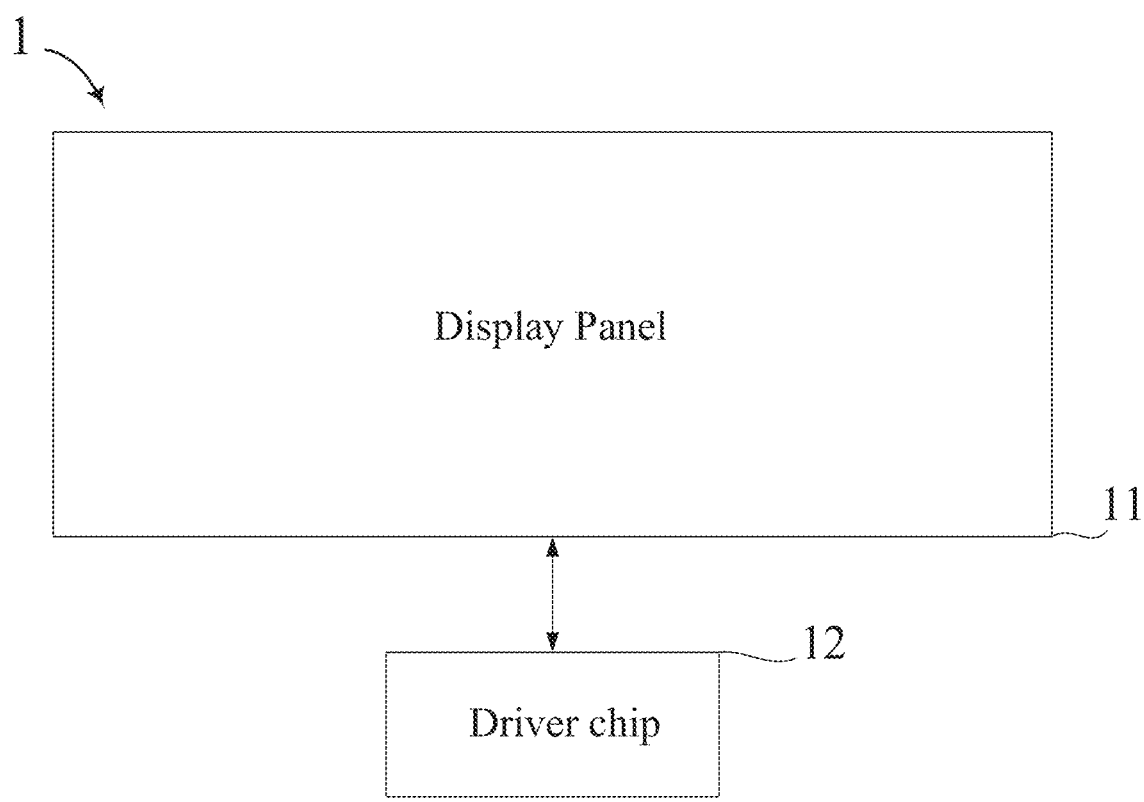
FIG. 5 is a schematic view of the display device of the embodiment of the present application provides.

Regarding the above technical issue, with reference to FIG. 5, the embodiment of the present application provides a display device, the display device 1 includes:

a display panel 11 including a first frequency and a second frequency, wherein the first frequency is greater than the second frequency, and a display time of a frame corresponding to the second frequency includes a first time section, a second time section, and a third time section in a sequence;

a touch chip 12 connected to the display panel 11, wherein the touch chip 12 is configured to transmit an uplink signal to an active stylus in the first time section and in the third time section in a previous frame when the display panel 11 is at the second frequency, a downlink signal returned by the active stylus according to the uplink signal, and the downlink signal includes first touch data and second touch data, and an anti-interference ability of the first touch data is lower than an anti-interference ability of the second touch data;

wherein the touch chip 12 is configured to transmit display data in the second time section, receive the first touch data in the third time section, and drive the display panel 11 according to the downlink signal.

The embodiment of the present application provides a display device, the display device divides one frame at the second frequency in the display panel into the first time section, the second time section, and the third time section, transmits the display data by the second time section, transmits the uplink signal with a lower anti-interference ability by the first time section and the third time section, adjusts data transmission sequence of the active stylus, and transmits the first touch data with the lower anti-interference ability by the third time section. When the uplink signal and the first touch data are transmitted in one frame, because the first time section and the third time section have no transmission of the display data, no display noise exists such that interference of the display noise with the data of the active stylus is prevented to improve a recognition rate of touch data of the active stylus.

In an embodiment, the touch chip is configured to detect the active stylus in real time, and control the display panel to switch from the first frequency to the second frequency when the active stylus existing is detected. Because signal transmission of the active stylus is better at the second frequency, during the active stylus interacting with the display device, when display panel is at the first frequency, display panel is required to switch from the first frequency to the second frequency, and then configuring the touch chip to detect the active stylus in real time controls the display panel to switch from the first frequency to the second frequency when the active stylus existing is detected.

In particular, when the display panel is at the second frequency, switching the frequency of the display panel is not required, and only the display panel keeping the second frequency is needed.

In an embodiment, the touch chip is configured to divide a display time of a frame corresponding to the second frequency by a display time of a frame corresponding to the first frequency, and divide the display time of the frame corresponding to the second frequency into the first time section, the second time section, and the third time section; a sum of a time length of the first time section and a time length of the second time section is less than a time length of the display time of the frame corresponding to the first frequency. Dividing the display time of the second frequency by the display time of the first frequency makes normal transmission of the display data at the second frequency and prevents failure of normal transmission of the display data due to an over short second time section.

In an embodiment, the display time of the frame corresponding to the first frequency includes a display time section and an initialization time section, the time length of the first time section is equal to a time length of the initialization time section, and the time length of the second time section is equal to the time length of the display time section. The time length of the first time section is equal to the time length of the initialization time section, and the time length of the second time section is equal to the time length of the display time section such that the display data can be transmitted normally by the first time section and the second time section when the display panel is at the second frequency, which makes the display panel normally displays. The third time section can be configured to transmit signal easily suffering interference in the active stylus, which prevents interference of the display noise with the data of the active stylus and improves the recognition rate of the touch data of the active stylus.

Regarding the pressure data and the angular data of the active stylus easily suffering interference, in an embodiment, the first touch data includes pressure data and angular data, the touch chip is configured to sequentially receive the pressure data and the angular data in the third time section, or sequentially receive the angular data and the pressure data in the third time section. In the data transmitted by the active stylus, the pen would transmit the pressure data to electrodes in the touch chip, which is easily interfered with. The angular data in the active stylus is transmitted by the pen collar. Because a height of the pen collar from the display device is greater than the pen tip, it has a lower signal energy and is easily interfered with. Therefore, the pressure data and the angular data serve as first touch data, the angular data and the pressure data are transmitted in the third time section to prevent the angular data and the pressure data from interference.

In particular, when transmission of the angular data and the pressure data is performed, the angular data can be transmitted first and then the pressure data can be transmitted later, or the pressure data can be transmitted first and then the angular data can be transmitted later as long as the angular data and the pressure data are transmitted in the third time section.

In an embodiment, a time length of the third time section is greater than a sum of a time length of transmission of the pressure data and a time length of the angular data. The time length of the third time section is greater than the sum of the time length of transmission of the pressure data and the time length of transmission of the angular data such that both the pressure data and the angular data can be transmitted completely in the third time section, which prevents transmission of portions of the pressure data and the angular data in the second time section resulting in influence to the pressure data and the angular data.

In an embodiment, the downlink signal further includes a responsive signal, the touch chip is configured to establish a link between the display panel and the active stylus after receiving the responsive signal transmitted by the active stylus. The touch chip, after transmitting the uplink signal, needs to receive a responsive signal returned by the active stylus and establish link between the display panel and the active stylus according to the responsive signal to display on the display panel according to the data of the active stylus.

In an embodiment, the touch chip is configured to receive the second touch data between a time section corresponding to the responsive signal and the time section of the first touch data after receiving the responsive signal in the second time section. When transmission of the second touch data is performed, the second touch data can be received between a time corresponding to the responsive signal and the time section of the first touch data. Because second touch data has not easily suffered interference, the second touch data can be normally transmitted.

In particular, signal easily suffering interference refers that signals are easily affected to have errors when the interference is greater than or equal to −60 dB.

Figures 6, 7:
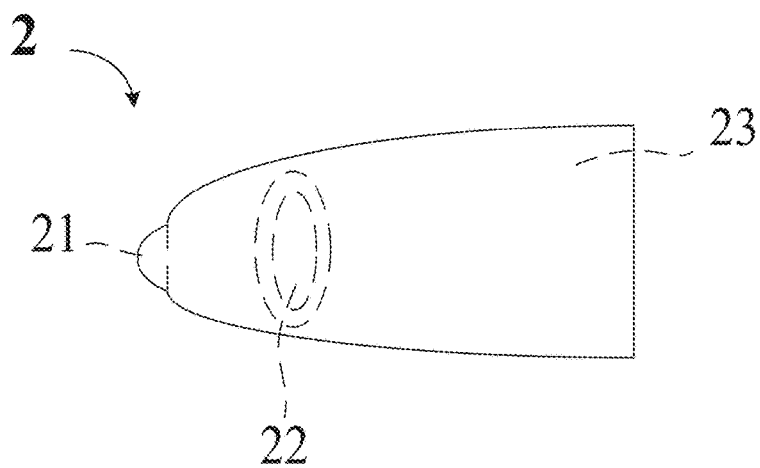
FIG. 6 is a schematic view of an active stylus provided by the embodiment of the present application.
FIG. 7 is a flowchart of a display device driving method provided by the embodiment of the present application.

With reference to FIG. 6, the embodiment of the present application provides an active stylus, the active stylus interacts with any one of the display devices in the above embodiments. The active stylus 2 includes:

a pen tip 21 configured to receive an uplink signal transmitted by the touch chip, and, according to the uplink signal, transmit a responsive signal and the second touch data in the second time section and transmit pressure data in the third time section; and a pen collar 22 configured to return angular data in the third time section, wherein the pressure data and the angular data are first touch data, and the first touch data, the second touch data, and the responsive signal is a downlink signal.

The embodiment of the present application provides an active stylus, the active stylus interacts with the display device, divides one frame at the second frequency in the display panel into the first time section, the second time section, and the third time section, transmits the display data by the second time section, transmits the uplink signal with a lower anti-interference ability by the first time section and the third time section, adjusts data transmission sequence of the active stylus, and transmits the first touch data with the lower anti-interference ability by the third time section. When the uplink signal and the first touch data are transmitted in one frame, because the first time section and the third time section have no transmission of the display data, no display noise exists such that interference of the display noise with the data of the active stylus is prevented to improve a recognition rate of touch data of the active stylus.

In an embodiment, with reference to FIG. 6, the active stylus 2 further includes a pen body 23. The pen body 23 is connected to the pen tip 21 and the pen collar 22.

Also, with reference to FIG. 7, the embodiment of the present application provides a display device driving method, the display device driving method drives any one of the display devices in the above embodiments, and the display device driving method includes:

a step S1 including detecting an active stylus in real time, and controlling the display panel to switch from the first frequency to the second frequency when the active stylus existing is detected, wherein the first frequency is greater than the second frequency, and a display time of a frame corresponding to the second frequency includes a first time section, a second time section, and a third time section in a sequence;

a step S2 including transmitting an uplink signal to the active stylus in the first time section and the third time section of a previous frame, and receiving a downlink signal returned by the active stylus according to the uplink signal, wherein the downlink signal includes first touch data and second touch data, and an anti-interference ability of the first touch data is lower than an anti-interference ability of the second touch data; wherein the step further includes transmitting display data in the second time section and receiving the first touch data in the third time section; and a step S3 including driving the display panel according to the downlink signal.

The embodiment of the present application provides a display device driving method. The display device driving method divides one frame at the second frequency in the display panel into the first time section, the second time section, and the third time section, transmits the display data by the second time section, transmits the uplink signal with a lower anti-interference ability by the first time section and the third time section, adjusts data transmission sequence of the active stylus, and transmits the first touch data with the lower anti-interference ability by the third time section. When the uplink signal and the first touch data are transmitted in one frame, because the first time section and the third time section have no transmission of the display data, no display noise exists such that interference of the display noise with the data of the active stylus is prevented to improve a recognition rate of touch data of the active stylus.

In an embodiment, before the step of detecting the active stylus in real time, controlling the display panel to switch from the first frequency to the second frequency when the active stylus existing is detected, the method further includes: when the display panel is at the second frequency, determining a display time of one frame of the display panel, and dividing a frame into the first time section, the second time section, and the third time section according to the display time of one frame.

Regarding different frequencies switch modes, the display panel has different data transmission manners in different frequencies. In an embodiment, before the step of when the display panel is at the second frequency, determining the display time of one frame of the display panel, and dividing the frame into the first time section, the second time section, and the third time section according to the display time of one frame, the method further includes:

parsing driving frequency data and determining a frequency switch mode of the display panel; and determining signal transmission modes of the display panel in different frequencies according to the frequency switch mode of the display panel. During driving the display panel, a frequency switch mode of the display panel would be determined in advance, a circuit and a driving method in the display panel would be designed accordingly such that the display panel can perform a frequency switch according to the frequency switch mode. For different frequency switch modes, the display panel has different data transmission methods. Therefore, a signal transmission mode of the display panel needs to be determined according to the frequency switch mode of the display panel in advance such that a time of the display panel can be divided according to the signal transmission mode to prevent the display noise from influencing the data of the active stylus.

In particular, a display frequency of the display panel switching from a high frequency to a low frequency (for example "Long V" switch mode, namely, by increasing a time of a frame and keeping a display time unchanged, no signal is outputted in the increased time) is used as an example. When the display panel switches to comparatively lower frequency, a certain time is added, and an actual display time is unchanged, and then the present application can use the added time to perform signal transmission of the active stylus to prevent display noise from interfering with the signal transmission of the active stylus during transmission of display data. A switching method of the display frequency of the display panel being skipping frames (frame skip) is used as an example, the switching mode of the display frequency would perform frequency switch by skipping frames. For example, when it switches from a high frame rate to a low frame rate, it is performed in the low frame rate by scanning one frame and stopping signal transmission in another frame to lower the low frame rate. At this time, one of adjacent two frames has no display data transmission. Therefore, signal transmission of the active stylus can be performed on the frame having no display data transmission to prevent the display noise from interfering with the signal transmission of the active stylus. Therefore, before the time section is divided, the switching method of the display frequency can be determined in advance for convenience of switching a frame.

It should be explained that when the switching method of the display frequency is skipping frames (frame skip), because a low frame rate would employs a method of one frame scanning and another frame stopping signal transmission, a time of two frames is actually used to accomplish a repeated data transmission. Therefore, actually, in the low frame rate, a total time length of adjacent two frames is a time of an effective frame. Therefore, in the following embodiment, the total time length of the adjacent two frames serves as a time of an effective frame, which will not be described repeatedly. Also, here adjacent two frames are used as an example, but no limit is set to a frequency switching method achieved by adjacent three or more frames.

Regarding the issue of overlap between the display time and the signal transmission time of the active stylus causes signal interference after conversion of the frame rate of the display panel, in an embodiment, the step of when the display panel is at the second frequency, determining the display time of one frame of the display panel, and dividing the frame into the first time section, the second time section, and the third time section according to the display time of one frame, includes:

determining the display time of one frame of the display panel when the display panel is at the first frequency;

determining the display time of one frame of the display panel when the display panel is at the second frequency according to the display time of one frame of the display panel and the signal transmission mode at the first frequency; and sequentially dividing the frame into the first time section, the second time section, and the third time section according to a total time of one frame of the display panel and the display time of one frame of the display panel at the second frequency. A necessary length of the display time during transmission of the display panel is determined by the display time of one frame at the first frequency, then when the display panel switches to a low frame rate, i.e., the second frequency, the display time can be determined by dividing the time of the frame corresponding to the second frequency, the first time section, the second time section, and the third time section are determined according to the display time and a total time of the frame such that signals easily suffering interference can be transmitted out of the display time to prevent noise existing during display from interfering with signals of the active stylus.

In an embodiment, the step of sequentially dividing the frame into the first time section, the second time section, and the third time section according to the total time of one frame of the display panel and the display time of one frame of the display panel at the second frequency, includes:

obtaining an initialization message of the display panel when the display panel is at the second frequency;

parsing the initialization message of the display panel and determining initialization time of one frame of the display panel;

determining the first time section of the display panel according to the initialization time of one frame of the display panel;

determining the second time section of the display panel according to display time of one frame of the display panel; and determining the third time section according to the total time of one frame of the display panel, the first time section, and the second time section. The first time section of the display panel is determined by the initialization time of the display panel, and the second time section of the display panel is determined by according to the display time of one frame of the display panel such that the third time section can be determined according to the total time of one frame of the display panel, the first time section, and the second time section. Also, the first time section, the second time section, and the third time section are divided in sequence such that during transmission of the display data and signals of the active stylus, signals can be transmitted in sequence to prevent a reversed signal transmission sequence resulting in inaccuracy of the display panel.

In an embodiment, the step of sequentially dividing the frame into the first time section, the second time section, and the third time section according to the total time of one frame of the display panel and the display time of one frame of the display panel at the second frequency, includes:

determining the third time section of the display panel according to the signal transmission mode, the display time of one frame of the display panel at the first frequency, and at the second frequency total time of one frame of the display panel;

determining the second time section of the display panel according to display time of one frame of the display panel; and determining the first time section according to the total time of one frame of the display panel, the second time section, and the third time section. The third time section of the display panel is determined by the signal transmission mode, and the second time section of the display panel is determined by the display time of one frame of the display panel such that the first time section can be determined according to the total time of one frame, the second time section, and the third time section. Also, the first time section, the second time section, and the third time section are divided sequentially such that during signal transmission of the display data and the active stylus, signals can be transmitted in sequence to prevent a reversed signal transmission sequence causing errors on the display panel.

In particular, the switching method of the display frequency being skipping frames (frame skip) is used as an example, the signal transmission mode is one of effective frames configured to transmit display data, and another frame has no data transmission. Therefore, the time section can be served as the third time section by determining the frame having no data transmission in the effective frame, and the frame configured to transmit display data necessarily includes an initialization phase and a display phase such that the second time section can be determined according to display time and then the first time section is determined.

Regarding the issue of noise existing during display data transmission and resulting in interference with signals of the active stylus, in an embodiment, the step of receiving the first touch data in the third time section, includes:

parsing the first touch data to obtain pressure data and angular data when the display panel is at the second frequency; and in the third time section of the frame, sequentially receiving the pressure data and the angular data or sequentially receiving the angular data and the pressure data. When the display panel is at the second frequency, the pressure data and the angular data (Ring Data) easily suffering interference of noise is determined in advance, then transmission times of the pressure data and the angular data are modified such that both transmissions of the pressure data and angular data are in third time section to prevent noise generated in the display time from interfering with the pressure data and the angular data. Because the pressure data and the angular data would be transmitted in the same frame, the pressure data and the angular data can be transmitted in sequence, or the angular data and the pressure data can be transmitted in sequence.

In an embodiment, the step of transmitting an uplink signal to the active stylus in the first time section and the third time section of the previous frame, and receiving the downlink signal returned by the active stylus according to the uplink signal, includes: receiving the second touch data in the frame.

Regarding the issue of the second touch data probably being interfered with the noise of the display time, in an embodiment, the step of receiving the second touch data in the frame, includes:

when the display panel is at the second frequency, transmitting the first touch data by the third time section of the frame, determining a first transmission time of the uplink signal, a second transmission time of the responsive signal, and a third transmission time of the first touch data;

determining a remaining time of the third time section according to the first transmission time, the second transmission time, the third transmission time, and the first time section and the third time section; and receiving the second touch data in the frame according to the second time section and the remaining time of the frame. A remaining time of the third time section is determined by transmission times of the uplink signal, the responsive signal, and the first touch data such that during transmission of the second touch data, transmission of the second touch data is performed by the remaining time of the third time section to reduce or prevent transmission of the second touch data in the display time section to lower probability of the second touch data having interference and improve stability of transmission of signals and data of the active stylus.

In an embodiment, before the step of receiving the second touch data in the frame according to the second time section and the remaining time of the frame, the method further includes:

obtaining a fourth transmission time of the second touch data; and comparing the fourth transmission time to the remaining time, and transmitting the second touch data in the remaining time when the fourth transmission time is less than the remaining time. Receiving the second touch data in the remaining time when the fourth transmission time is less than remaining time is able to prevent transmission of the first touch data and the second touch data in the display time to avoid noise existing in the display time from interfering with the first touch data and the second touch data and causing abnormal images displayed by the display panel.

Regarding the issue of second touch data probably suffering interference of noise of the display time, in an embodiment, the step of receiving the second touch data in the frame according to the second time section and the remaining time of the frame, includes:

determining data transmission time according to the second time section and the remaining time of the frame;

obtaining a fourth transmission time of the second touch data; and receiving the second touch data by the remaining time and a portion of the second time section when a sum of the fourth transmission time and a time interval of an adjacent data transmission is less than the data transmission time. The second touch data is transmitted by the remaining time and a portion of the second time section such that the first time section and the third time section are fully employed during transmission of signals of the active stylus to reduce or avoid a time length of transmission of the signals of the active stylus in the display time to reduce or eliminate interference of the display time to the second time section.

In an embodiment, before the step of receiving the second touch data by the remaining time and the portion of the second time section when the sum of the fourth transmission time and the time interval of an adjacent data transmission is less than the data transmission time, the method further includes:

comparing the data transmission time to the fourth transmission time;

when a sum of the fourth transmission time and a time interval of an adjacent data transmission is less than the data transmission time, amending the fourth transmission time such that the sum of the fourth transmission time and the time interval of the adjacent data transmission is equal to the data transmission time. Data transmission process of the active stylus fully uses a time of a frame such that each of data has a sufficient time for transmission to prevent incomplete data transmission causing display issues. The second touch data has a stronger anti-interference ability and can prevent the noise of the display time from interfering with the data easily suffering interference. The data of the active stylus can be transmitted completely.

It should be explained that the above embodiment uses the display panel including two frequencies as an example for explanation, but the embodiment of the present application is not limited thereto. For example the display panel including three frequencies can also uses a time without transmission of display data to perform a transmission process of signals of the active stylus having a weaker anti-interference ability.

It should be explained that the above embodiment uses two display frequency switching methods of "Long V" and skipping frames (frame skip) as examples for explanation, but the embodiment of the present application is not limited thereto. Other display frequency switching method having a time section without transmission of display data can use the above methods.

It should be explained that because the display panel also has a time section without transmission of display data when at a high frequency, for example initialization would exist before adjacent transmissions of the frame display data, however, such time is shorter, only serves an initialization time for the display data, and cannot completely transmit signals with a lower anti-interference ability in the active stylus. Therefore, when the display panel is a single frequency display panel or the display panel is a multi-frequency display panel and the display panel is at the high frequency, transmission of signals of the active stylus necessarily has interference of noise to the active stylus. The present application uses a time without transmitting display data at a low frequency to perform transmission of data with a poor anti-interference ability in the active stylus to prevent interference of the display noise with the data of the active stylus and improve a recognition rate of the touch data of the active stylus.

In particular, the display panel including 120 Hz and 60 Hz and utilizing a frequency switch mode of skipping frames (frame skip) is used as an example. It can be known that an added time at 60 Hz is a sum of the display time and the initialization time. Such time has a length of an effective frame at 120 Hz and is sufficient to transmit some data with the lowered anti-interference ability in the active stylus, and even is sufficient to transmit all data of the active stylus. At 120 Hz, a time of one frame is mainly used for transmission of display data and necessarily results in the data with the lower anti-interference ability in the active stylus overlapping the transmission time of the display data. Therefore, the present application performs transmission of data with the poor anti-interference ability in the active stylus by the time without transmission of display data at the low frequency to prevent interference of display noise with the data of the active stylus and improve a recognition rate of the touch data of the active stylus.

In particular, the present application also adjusts each transmission sequence of data of the active stylus such that data with the poor anti-interference ability can be transmitted in the time without transmission of the display data during interaction of the active stylus with the display panel and fully utilize the time section without transmission of the display data for data transmission without reducing a transmission time of each data resulting in defects of the display data.

Figure 8:
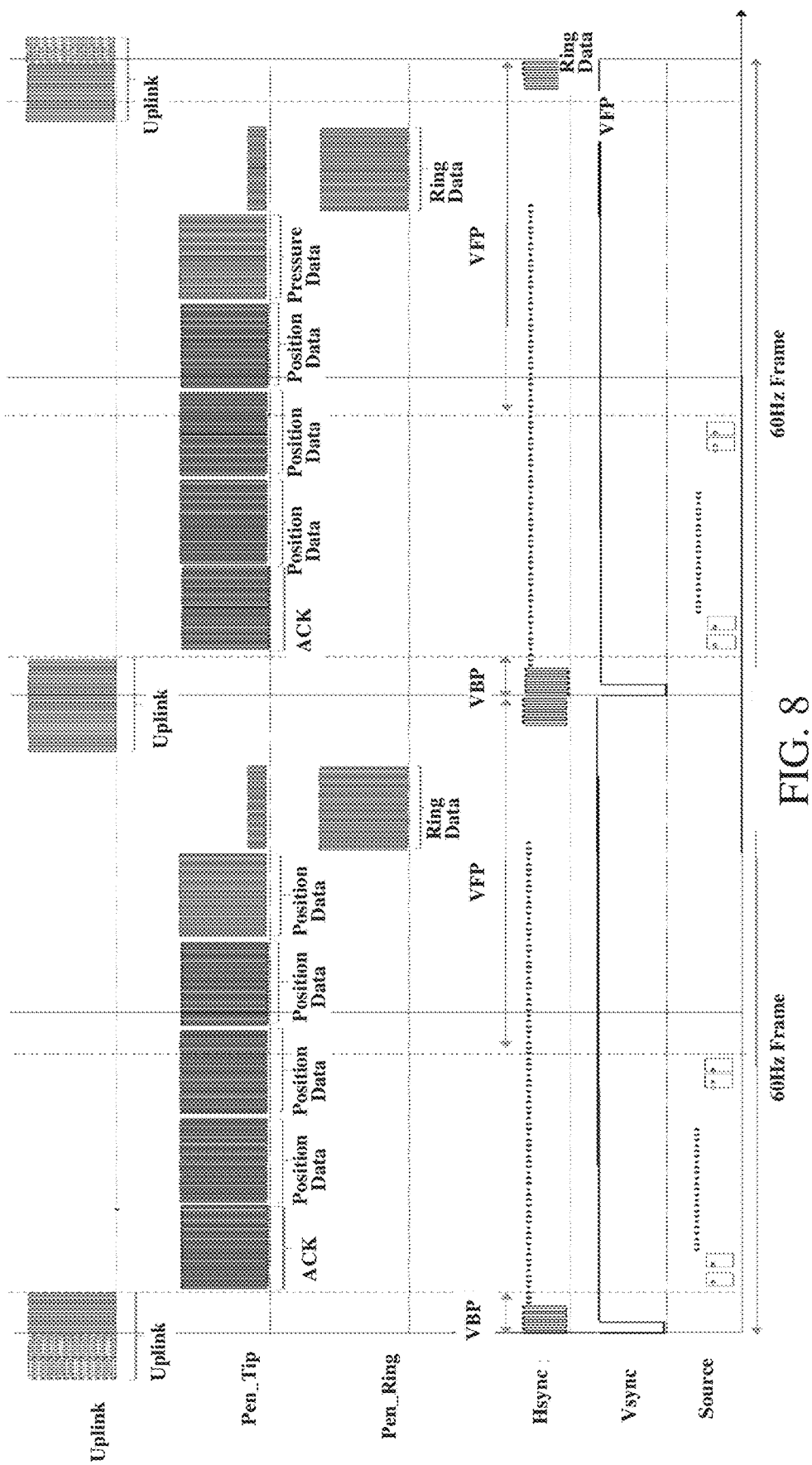
FIG. 8 is a time sequence chart corresponding to the display device provided by the embodiment of the present application.

With reference to FIG. 8, the display panel having the first frequency of 120 Hz and the second frequency of 60 Hz is used as an example. When the display panel is at 60 Hz, as shown in FIG. 8, one frame can be divided into a plurality of time section, namely, the 60 Hz frame (one frame at 60 Hz) in FIG. 8 includes the first time section VBP, the third time section VFP, and the second time section between the first time section VBP and the third time section VFP. When interacting signals between the display panel and the active stylus are transmitted, the connection between the display panel and the active stylus needs to be established first. Therefore, with reference to FIG. 8, it is required to transmit an uplink signal Uplink of the display panel to the active stylus first. The present application employs the third time section of a previous frame and the first time section VBP of a current frame to perform transmission. Compared to conventional sequential signal transmission transmitting the uplink signal between the first time section and the display time and causing the uplink signal interfered with the display noise, the present application transmits the uplink signal between the first time section and the third time section and is able to prevent noise interfering the uplink signal during transmitting the display data.

It is required to receive the downlink signal returned by the active stylus including Pen-Tip and Pen-Ring in FIG. 8. The responsive signal needs to be received first to establish connection between the display panel and the active stylus. Because the responsive signal has a stronger anti-interference ability and needs to be transmitted before transmission of other signals of the active stylus, therefore, the responsive signal ACK in FIG. 8 is within the second time section. However, it should be noted that because an uplink transmission time of the uplink signal is longer, therefore, the responsive signal ACK can only be transmitted in the second time section. However, when the first time section still has a remaining time, the responsive signal ACK can be transmitted by the first time section, and the present application has no limit thereto.

After the connection between the display panel and the active stylus is established through the uplink signal Uplink and the responsive signal ACK, touch data of the active stylus can be transmitted such that the display panel performs corresponding display according to touch data. With reference to FIG. 8, the present application, by changing the transmission sequence and the transmission time of the first touch data and the second touch data, specifically transmit the pressure data Pressure Data and the angular data Ring Data in the first touch data in the third time section, and transmits the position data Position Data in the second touch data by the time between the first touch data and the responsive signal to prevent the first touch data with the poor anti-interference ability from interfering with the noise, and transmission of each data can still be completed in one frame.

For other data of the display panel, it can be transmitted normally, with reference to FIG. 8, a row synchronization signal Hsync, a column synchronization signal Vsync and a data signal source can be transmitted according to variation of the frame rate normal.

It can be understood according to the above embodiment that:

the embodiment of the present application provides a display device, a driving method thereof, and an active stylus thereof. The display panel includes a first frequency and a second frequency. The first frequency is greater than the second frequency, a display time of one frame corresponding to the second frequency includes a first time section, a second time section, and a third time section in a sequence. The touch chip is connected to the display panel, and the touch chip is configured to, when the display panel is at the second frequency, transmit an uplink signal to the active stylus in the first time section and the third time section of a previous frame, and receive a downlink signal returned by the active stylus according to the uplink signal. The downlink signal includes first touch data and second touch data. An anti-interference ability of the first touch data is lower than an anti-interference ability of the second touch data. The touch chip is configured to transmit display data in the second time section, receive first touch data in the third time section, and drive the display panel according to the downlink signal. The present application divides one frame at the second frequency in the display panel into the first time section, the second time section, and the third time section, transmits the display data by the second time section, transmits the uplink signal with a lower anti-interference ability by the first time section and the third time section, adjusts data transmission sequence of the active stylus, and transmits the first touch data with the lower anti-interference ability by the third time section. When the uplink signal and the first touch data are transmitted in one frame, because the first time section and the third time section have no transmission of the display data, no display noise exists such that interference of the display noise with the data of the active stylus is prevented to improve a recognition rate of touch data of the active stylus.

In the above-mentioned embodiments, the descriptions of the various embodiments are focused. For the details of the embodiments not described, reference may be made to the related descriptions of the other embodiments.

The display device, the driving method thereof, and the active stylus thereof provided by the embodiment of the present application are described in detail as above. The principles and implementations of the present application are described in the following by using specific examples. The description of the above embodiments is only for assisting understanding of the technical solutions of the present application and the core ideas thereof. Those of ordinary skill in the art should understand that they can still modify the technical solutions described in the foregoing embodiments or equivalently replace some of the technical features. These modifications or replacements do not make the essence of the technical solutions depart from a range of the technical solutions of the embodiments of the present application.

What is claimed is:

1. A display device, comprising:
    a display panel comprising a first frequency and a second frequency, wherein the first frequency is greater than the second frequency, and a display time of a frame corresponding to the second frequency comprises a first time section, a second time section, and a third time section in a sequence; and
    a touch chip connected to the display panel, wherein the touch chip is configured to transmit an uplink signal to an active stylus in the first time section and in the third time section in a previous frame when the display panel is at the second frequency, and receive a downlink signal returned by the active stylus according to the uplink signal, and the downlink signal comprises first touch data and second touch data, and an anti-interference ability of the first touch data is lower than an anti-interference ability of the second touch data;
    wherein the touch chip is configured to transmit display data in the second time section, receive the first touch data in the third time section, and drive the display panel according to the downlink signal.

2. The display device according to claim 1, wherein the touch chip is configured to detect the active stylus in real time, and control the display panel to switch from the first frequency to the second frequency when the active stylus is detected.

3. The display device according to claim 1, wherein the touch chip is configured to divide a display time of a frame corresponding to the second frequency by a display time of a frame corresponding to the first frequency, and divide the display time of the frame corresponding to the second frequency into the first time section, the second time section, and the third time section; a sum of a time length of the first time section and a time length of the second time section is less than a time length of the display time of the frame corresponding to the first frequency.

4. The display device according to claim 3, wherein the display time of the frame corresponding to the first frequency comprises a display time section and an initialization time section, the time length of the first time section is equal to a time length of the initialization time section, and the time length of the second time section is equal to the time length of the display time section.

5. The display device according to claim 1, wherein the first touch data comprises pressure data and angular data, the touch chip is configured to sequentially receive the pressure data and the angular data in the third time section, or sequentially receive the angular data and the pressure data in the third time section.

6. The display device according to claim 5, wherein a time length of the third time section is greater than a sum of a time length of transmission of the pressure data and a time length of the angular data.

7. The display device according to claim 1, wherein the downlink signal further comprises a responsive signal, the touch chip is configured to establish a link between the display panel and the active stylus after receiving the responsive signal transmitted by the active stylus.

8. The display device according to claim 7, wherein the touch chip is configured to receive the second touch data between a time section corresponding to the responsive signal and the time section of the first touch data after receiving the responsive signal in the second time section.

9. An active stylus, interacting with the display device according to claim 1, and the active stylus comprising:
    a pen tip configured to receive an uplink signal transmitted by the touch chip, and, according to the uplink signal, transmit a responsive signal and the second touch data in the second time section and transmit pressure data in the third time section; and
    a pen collar configured to return angular data in the third time section, wherein the pressure data and the angular data are first touch data, and the first touch data, the second touch data, and the responsive signal is a downlink signal.

10. A display device driving method, to drive the display device according to claim 1, and the display device driving method comprising:
    detecting an active stylus in real time, and controlling the display panel to switch from the first frequency to the second frequency when the active stylus is detected, wherein the first frequency is greater than the second frequency, and a display time of a frame corresponding to the second frequency comprises a first time section, a second time section, and a third time section in a sequence;
    transmitting an uplink signal to the active stylus in the first time section and the third time section of a previous frame, and receiving a downlink signal returned by the active stylus according to the uplink signal, wherein the downlink signal comprises first touch data and second touch data, and an anti-interference ability of the first touch data is lower than an anti-interference ability of the second touch data; wherein the step further comprises transmitting display data in the second time section and receiving the first touch data in the third time section; and driving the display panel according to the downlink signal.

11. The display device driving method according to claim 10, wherein before the step of detecting the active stylus in real time, controlling the display panel to switch from the first frequency to the second frequency when the active stylus is detected, the method further comprises: when the display panel is at the second frequency, determining a display time of one frame of the display panel, and dividing a frame into the first time section, the second time section, and the third time section according to the display time of one frame.

12. The display device driving method according to claim 11, wherein before the step of when the display panel is at the second frequency, determining the display time of one frame of the display panel, and dividing the frame into the first time section, the second time section, and the third time section according to the display time of one frame, the method further comprises:

parsing driving frequency data and determining a frequency switch mode of the display panel; and determining signal transmission modes of the display panel in different frequencies according to the frequency switch mode of the display panel.

13. The display device driving method according to claim 12, wherein the step of when the display panel is at the second frequency, determining the display time of one frame of the display panel, and dividing the frame into the first time section, the second time section, and the third time section according to the display time of one frame, comprises:

determining the display time of one frame of the display panel when the display panel is at the first frequency;

determining the display time of one frame of the display panel when the display panel is at the second frequency according to the display time of one frame of the display panel and the signal transmission mode at the first frequency; and sequentially dividing the frame into the first time section, the second time section, and the third time section according to a total time of one frame of the display panel and the display time of one frame of the display panel at the second frequency.

14. The display device driving method according to claim 13, wherein the step of sequentially dividing the frame into the first time section, the second time section, and the third time section according to the total time of one frame of the display panel and the display time of one frame of the display panel at the second frequency, comprises:

obtaining an initialization message of the display panel when the display panel is at the second frequency;

parsing the initialization message of the display panel and determining initialization time of one frame of the display panel;

determining the first time section of the display panel according to the initialization time of one frame of the display panel;

determining the second time section of the display panel according to display time of one frame of the display panel; and determining the third time section according to the total time of one frame of the display panel, the first time section, and the second time section.

15. The display device driving method according to claim 13, wherein the step of sequentially dividing the frame into the first time section, the second time section, and the third time section according to the total time of one frame of the display panel and the display time of one frame of the display panel at the second frequency, comprises:

determining the third time section of the display panel according to the signal transmission mode, the display time of one frame of the display panel at the first frequency, and at the second frequency total time of one frame of the display panel;

determining the second time section of the display panel according to display time of one frame of the display panel; and determining the first time section according to the total time of one frame of the display panel, the second time section, and the third time section.

16. The display device driving method according to claim 10, wherein the step of receiving the first touch data in the third time section, comprises:

parsing the first touch data to obtain pressure data and angular data when the display panel is at the second frequency; and in the third time section of the frame, sequentially receiving the pressure data and the angular data or sequentially receiving the angular data and the pressure data.

17. The display device driving method according to claim 10, wherein the step of transmitting an uplink signal to the active stylus in the first time section and the third time section of the previous frame, and receiving the downlink signal returned by the active stylus according to the uplink signal, comprises: receiving the second touch data in the frame.

18. The display device driving method according to claim 17, wherein the step of receiving the second touch data in the frame, comprises:

when the display panel is at the second frequency, transmitting the first touch data by the third time section of the frame, determining a first transmission time of the uplink signal, a second transmission time of the responsive signal, and a third transmission time of the first touch data;

determining a remaining time of the third time section according to the first transmission time, the second transmission time, the third transmission time, and the first time section and the third time section; and receiving the second touch data in the frame according to the second time section and the remaining time of the frame.

19. The display device driving method according to claim 18, wherein before the step of receiving the second touch data in the frame according to the second time section and the remaining time of the frame, the method further comprises:

obtaining a fourth transmission time of the second touch data; and comparing the fourth transmission time to the remaining time, and transmitting the second touch data in the remaining time when the fourth transmission time is less than the remaining time.

20. The display device driving method according to claim 18, wherein the step of receiving the second touch data in the frame according to the second time section and the remaining time of the frame, comprises:

determining data transmission time according to the second time section and the remaining time of the frame;
obtaining a fourth transmission time of the second touch data; and
receiving the second touch data by the remaining time and a portion of the second time section when a sum of the fourth transmission time and a time interval of an adjacent data transmission is less than the data transmission time.

* * * * *